Figure 1:
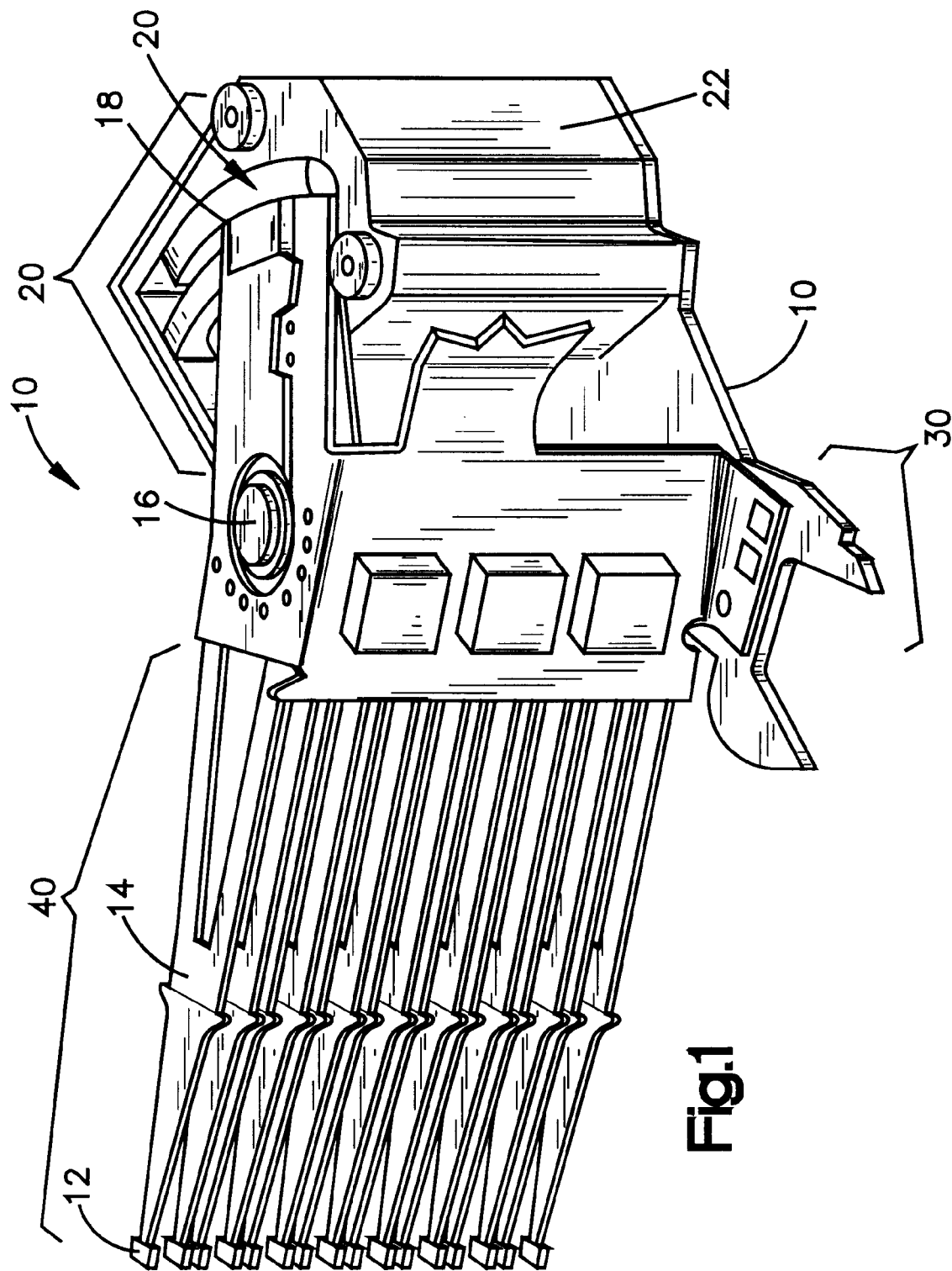

United States Patent

Kaczynski et al.

[11] Patent Number: 6,057,989
[45] Date of Patent: May 2, 2000

[54] COMPOSITE DISK DRIVE ARMSET

[75] Inventors: Donald J. Kaczynski, Oak Harbor; Fritz C. Grensing, Perrysburg, both of Ohio

[73] Assignee: Brush Wellman, Inc., Cleveland, Ohio

[21] Appl. No.: 09/034,212

[22] Filed: Feb. 25, 1998

Related U.S. Application Data

[60] Provisional application No. 60/039,820, Feb. 26, 1997.

[51] Int. Cl.[7] ............................ G11B 21/08; G11B 21/16; G11B 21/22
[52] U.S. Cl. ............................ 360/106; 360/104; 360/105
[58] Field of Search ..................................... 360/106, 104, 360/105

[56] References Cited

U.S. PATENT DOCUMENTS

| | | | |
|---|---|---|---|
| 5,260,847 | 11/1993 | Basehore et al. | 360/106 |
| 5,475,549 | 12/1995 | Marder et al. | 360/106 |
| 5,551,997 | 9/1996 | Marder et al. | 360/106 |
| 5,594,607 | 1/1997 | Erpelding et al. | 360/104 |
| 5,667,600 | 9/1997 | Grensing et al. | 360/106 |
| 5,840,135 | 11/1998 | Grant et al. | 360/106 |

*Primary Examiner*—Craig A. Renner
*Attorney, Agent, or Firm*—Calfee, Halter & Griswold, LLP

[57] ABSTRACT

An actuator armset for a computer disk drive, the armset having a bore for rotating about a spindle of the disk drive to position a transducer radially across a disk of the drive, components of the armset including a body, a coil housing, a crash stop, and a plurality of actuator arms, each component comprising a selected amount of beryllium, the amount of beryllium selected for each component differing necessarily from that for the other components, such that maximum armset performance is provided at a relatively low cost.

20 Claims, 1 Drawing Sheet

COMPOSITE DISK DRIVE ARMSET

The present invention is based on provisional application No. 60/039,820 filed Feb. 26, 1997.

DISCLOSURE OF THE INVENTION

This invention relates generally to composite structures and, more particularly, to a composite of beryllium-containing and/or nonberyllium-containing materials.

Performance of electromechanical components such as those of computer disk drives has been found dependent substantially upon the properties of the component materials. For instance, to accurately pass data to and from the disk, it has been found necessary to precisely align transducers on the actuator armset with tracks on the disk. When the temperature of the disk drive rises, as is common during operation, the armset expands, interfering with the transfer of data to and from the disk. It is therefore desirable that the armset be constructed of materials having nominal coefficients of thermal expansion, i.e., which expand minimally when subjected to increasing temperatures.

To insure quick and precise armset movement using minimal power, it has also been found necessary to use light weight materials so that the forces of inertia exerted by the armset may be reduced. By using low weight (density) materials, the armset's moment of inertia is reduced, disk drive performance is improved, and power consumption minimized.

In addition, materials are desired which have both a high stiffness to mass ratio and high resonant frequency. This provides the armset with the strength to withstand frequent sudden movements as are typically experienced during disk drive operation, while minimizing armset vibration and settling time.

To this end, materials such as silicon carbide, aluminum, beryllium, magnesium and their alloys have been found beneficial for their low thermal expansion, high stiffness and resonant frequency. However, associated material and manufacturing costs of such components to achieve desired performance levels have been found to limit the attractiveness of these materials for commercial applications.

Accordingly, it is an object of the present invention to provide a composite actuator armset having optimal performance at low cost.

Another object of the present invention is to assemble an actuator armset of beryllium-containing components made from net shape fabrication processes.

A further object of the present invention is to provide a composite actuator armset assembled of components containing beryllium, aluminum, magnesium, and/or alloys thereof, plastics, and/or beryllium oxide.

Yet another object of the present invention is to provide a composite actuator armset having optimum beryllium contents for maximum performance.

Yet a further object of the present invention is to provide a composite actuator armset containing optimum levels of beryllium for minimum cost but optimum performance requirements.

The present invention will now be further described by reference to the following drawing which is not intended to limit the accompanying claims.

FIG. 1 is a perspective view of an actuator armset in accordance with one aspect of the present invention.

Still other objects and advantages of the present invention will become apparent from the following description of the preferred embodiments.

In accordance with one aspect of the present invention is an actuator armset for a computer disk drive, components of the armset each comprising a selected amount of beryllium. The armset has a bore for rotating about a spindle of the disk drive to position a transducer radially across a disk of the drive. As shown in FIG. 1, the components include a body 10, a coil housing 20, a crash stop 30, and a plurality of actuator arms 40. The amount of beryllium selected for each component differs necessarily from that for the other components, such that maximum armset performance is provided at the lowest possible cost.

According to one embodiment, the body is comprised of beryllium generally within a range of 40% and 60% suitable for relatively high performance requirements; the coil housing contains beryllium generally within a range of 30% and 62%; the actuator arms comprise beryllium generally within a range of 62% and 100%; the balance of the foregoing components comprising aluminum, magnesium, and/or a semi-solid processed alloy thereof. The crash stop is preferably comprised of beryllium, aluminum, magnesium, and/or a semi-solid processed alloy thereof.

Alternatively, the body consists essentially of beryllium generally within a range of 20% and 40%, the balance aluminum, magnesium, and/or a semi-solid processed alloy thereof, suitable for relatively intermediate performance requirements and lower cost.

According to another alternative embodiment, the body is comprised of beryllium generally within a range of 0% and 20%, the balance again being aluminum, magnesium, and/or a semi-solid processed alloy thereof. This substantially lower beryllium content is proposed for minimum performance requirements and lowest cost applications.

Generally speaking, performance requirements determine which molding materials are to be used to encase the actuator arms. Beryllium-containing materials are generally preferred for the armset body to enhance performance, though it is understood that beryllium is not required. Other suitable materials include beryllium oxide, semi-solid processed and/or nonsemi-solid processed alloys of aluminum, magnesium, composites of aluminum and magnesium, and plastics (filled or unfilled) such as liquid crystal polymers. Such materials may be used to encase actuator arms, form the drive arm body, and/or form the body and some of the appendages (e.g., crash stop, coil housing, etc.). Similarly, arm subassemblies can be fabricated (i.e., into prefab components) which are later assembled into a complete disk drive arm system.

Preferably, a molding process such as semi-solid processing is utilized in combination with pre-fabricated beryllium-containing appendages to produce the actuator armset. Semi-solid processed alloys and processes of this type are described, for example, in U.S. Pat. No. 5,413,644 which issued on May 9, 1995 to James M. Marder and Warren J. Haws, entitled "Beryllium-Containing Alloys Of Magnesium", and in U.S. Pat. No. 5,551,997 which issued on Sep. 3, 1996 also to James M. Marder and Warren J. Haws, entitled "Beryllium-Containing Alloys Of Aluminum And Semi-Solid Processing Of Such Alloys"; the disclosures of which are hereby incorporated by reference in their entireties.

Corresponding processes for molding plastics, e.g., injection molding, are conventional and considered known by those skilled in the art. Further discussion is believed unnecessary for purposes of illustrating the present invention.

According to another embodiment, a wire slurry saw is applied to the materials, i.e., used to saw profiled billets of beryllium-containing materials, to produce arms, coil housings, crash stops, and/or other appendages or components of the actuator armset. Alternatively, this process is modified by applying the saw to cut sheets of beryllium-containing material from billets. The sheets are then assembled into armset components by Wire EDM, laser cutting, fine blanking or other conventional processes.

In accordance with yet another embodiment, the actuator arms are produced of beryllium composite or beryllium oxide fingers made from flat stock. This is accomplished using high volume conventional processes such as wire slurry sawing, laser cutting, fine blanking, press and sinter, stamping, wire electrical discharge machining, etc. The arms are then manufactured using an insert molding process, wherein the arms are inserted into cavities in the die. Alloys, composites or combinations of semi-solid processed and/or nonsemi-solid processed aluminum, magnesium, and/or beryllium are used to form the central hub and bond the inserted arms together into a single piece. The molding metal is in a liquid state such as would be used in a die casting operation or, alternatively, in a semi-solid form.

According to a further embodiment, plastics such as liquid crystal polymers are used in place of metal for the molding process, where the final actuator arms have beryllium or beryllium-containing material appendages and a plastic body. Liquid crystal polymers are considered particularly attractive because of their relatively high modulus. Alternatively, a filled plastic is used, of a type which can be suitably molded around the arms. Use of a filler permits properties of the plastic, such as thermal conductivity, electrical conductivity, modulus, and/or thermal expansion coefficient, to be tailored to match or compliment properties of the arm material.

In general, use of plastics with beryllium alloy arms is considered more manufacturable though appropriate for low performance, low cost applications.

Aluminum-beryllium and magnesium-beryllium alloys are considered particularly desirable among beryllium alloys for construction of the appendages or body. Un-alloyed beryllium is also desirable. Alternatively, an arm of beryllia is used in conjunction with a body of aluminum-beryllium or magnesium-beryllium. It is noted that the aluminum or magnesium alloy used for the body does not have to contain beryllium, though beryllium is desirable. Also, an appropriate plastic-based body could be used with any arm material.

Actuator armsets, according to various aspects of the present invention, include constructions such as a one piece unit, and those having multicomponent, multilayer laminate, or multisection construction. It is also understood that sleeved, molded sleeve, or sleeveless armset constructions of either composite or non-composite materials are also within the spirit and scope of the present invention.

Armsets of the foregoing descriptions are set forth, for example, in U.S. Pat. No. 5,475,549 which issued on Dec. 12, 1995 to James M. Marder and Warren J. Haws, entitled "Magnesium-Beryllium Disk Drive Armset", and in U.S. Pat. No. 5,578,146 which issued on Nov. 26, 1996 to Larry A. Grant, James M. Marder and Wayne L. Wright, entitled "Aluminum-Beryllium Alloys Having High Stiffness And Low Thermal Expansion For Memory Devices"; the disclosures of which are hereby incorporated by reference in their entireties.

Although the present invention is shown and described in conjunction with an actuator armset, it is understood that other electromechanical components or articles may be constructed of such composite materials, giving consideration to the purpose for which the present invention is intended.

Overall, the present invention provides a novel composite disk drive armset which enables the selective use of high performance components and materials, e.g., high beryllium content, where high performance characteristics are relatively important; whereas relatively lower performance, lower cost components and materials may be used where performance demands or significance are comparatively less, e.g., low beryllium content alloys, alloys of aluminum and/or magnesium, beryllium oxide, and/or plastics.

Accordingly, high cost, high beryllium content components need not be used in every armset component when performance requirements may warrant that only the arms need to be made of such material. Use of varying processing techniques is also provided, ranging from semi-solid processing to injection molding, to suitably adjust performance requirements and economics.

Various modifications and alterations to the present invention may be appreciated based on a review of this disclosure. These changes and additions are intended to be within the scope and spirit of this invention as defined by the following claims.

What is claimed is:

1. An actuator armset for a computer disk drive, the armset having a body defining a bore for rotating the armset about an actuator shaft and multiple actuator arms attached to the body for positioning respective transducers radially across one or more disks of the drive, wherein the actuator arms are prefabricated from a first alloy of Al or Mg containing 62 to 100 wt. % Be, and wherein the body of the armset is formed by a molding operation with the prefabricated actuator arms being positioned in place during the molding operation so that the material forming the body bonds the actuator arms in place into a single piece unit as the body is formed, wherein the material forming the body has a different wt. % of Be than the first alloy.

2. The armset of claim 1, wherein the body is formed from a second alloy of Al or Mg also containing Be in an amount of up to 60 wt. %.

3. The armset of claim 2, wherein the second alloy is in liquid form when molded into the body of the armset.

4. The armset of claim 2, wherein the second alloy is in semi-solid form with Be particles being dispersed in molten Al or Mg when molded into the body of the armset.

5. The armset of claim 4, wherein the armset further includes a coil housing made from a third alloy of Mg or Al also containing Be, the amount of Be in the third alloy being 30 to 62 wt. % but different than the amounts of Be contained in the first alloy and the second alloy.

6. The armset of claim 5, wherein the armset further includes a crash stop made from a fourth alloy, the fourth alloy containing at least one of Be, Mg and Al.

7. The armset of claim 4, wherein the second alloy contains >0 to 20 wt. % Be, whereby the armset is suitable for lower cost, lower performance applications.

8. The armset of claim 4, wherein the second alloy contains 20 to 40 wt. % Be, whereby the armset is suitable for intermediate cost, intermediate performance applications.

9. The armset of claim 4, wherein the second alloy contains 40 to 60 wt. % Be, whereby the armset is suitable for higher cost, higher performance applications.

10. The armset of claim 2, wherein the armset further includes a coil housing made from a third alloy of Mg or Al also containing Be, the amount of Be in the third alloy being 30 to 62 wt. % but different than the amounts of Be contained in the first alloy and the second alloy.

11. The armset of claim 10, wherein the armset further includes a crash stop made from a fourth alloy, the fourth alloy containing at least one of Be, Mg and Al.

12. The armset of claim 2, wherein the second alloy contains >0 to 20 wt. % Be, whereby the armset is suitable for lower cost, lower performance applications.

13. The armset of claim 2, wherein the second alloy contains 20 to 40 wt. % Be, whereby the armset is suitable for intermediate cost, intermediate performance applications.

14. The armset of claim 2, wherein the second alloy contains 40 to 60 wt. % Be, whereby the armset is suitable for higher cost, higher performance applications.

15. An actuator armset for a computer disk drive, the armset having a body defining a bore for rotating the armset about an actuator shaft, multiple actuator arms attached to the body for positioning respective transducers radially across one or more disks of the drive and a coil housing, wherein the actuator arms are made from a first alloy of Al or Mg containing 62 to 100 wt. % Be, and wherein the coil housing is made from a third alloy of Al or Mg containing 30 to 62 wt. % Be, the wt. % of Be in the third alloy being different from the wt. % of Be in the first alloy.

16. The armset of claim 15, wherein the body of the armset is made from a second alloy of Al or Mg containing Be in an amount of >0 to 60 wt. %, the amount of Be in the second alloy being different from the amounts of Be in the first alloy and the third alloy.

17. The armset of claim 16, wherein the body of the armset is formed by an insert molding operation with the actuator arms being positioned in place during the molding operation so that the second alloy bonds the actuator arms in place into a single piece unit as the body is formed, the second alloy containing >0 to 20 wt. % Be and being in semi-solid form with Be particles being dispersed in molten Al or Mg when molded into the body of the armset.

18. The armset of claim 16, wherein the body of the armset is formed by an insert molding operation with the actuator arms being positioned in place during the molding operation so that the second alloy bonds the actuator arms in place into a single piece unit as the body is formed, the second alloy containing 20 to 40 wt. % Be and being in semi-solid form with Be particles being dispersed in molten Al or Mg when molded into the body of the armset.

19. The armset of claim 16, wherein the body of the armset is formed by an insert molding operation with the actuator arms being positioned in place during the molding operation so that the second alloy bonds the actuator arms in place into a single piece unit as the body is formed, the second alloy containing 40 to 60 wt. % Be and being in semi-solid form with Be particles being dispersed in molten Al or Mg when molded into the body of the armset.

20. The armset of claim 16, wherein the armset further includes a crash stop made from a fourth alloy, the fourth alloy containing at least one of Be, Mg and Al.

* * * * *